United States Patent
Rouquette et al.

(10) Patent No.: US 8,175,760 B2
(45) Date of Patent: May 8, 2012

(54) DISPLAYING METHOD AND DEVICE FOR AN AIRCRAFT FOLLOWING A FLIGHT PLAN

(75) Inventors: Patrice Rouquette, Pompertuzat (FR); Nolween Laveant, Toulouse (FR); Didier Have, Toulouse (FR); Arnaud Le Tellier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1120 days.

(21) Appl. No.: 11/993,007

(22) PCT Filed: Jun. 19, 2006

(86) PCT No.: PCT/FR2006/001379
§ 371 (c)(1),
(2), (4) Date: Dec. 18, 2007

(87) PCT Pub. No.: WO2006/136687
PCT Pub. Date: Dec. 28, 2006

(65) Prior Publication Data
US 2010/0023258 A1    Jan. 28, 2010

(30) Foreign Application Priority Data
Jun. 21, 2005  (FR) ....................... 05 06256

(51) Int. Cl.
*G01C 5/00* (2006.01)

(52) U.S. Cl. .............. 701/9; 701/4; 701/8; 701/408; 701/466; 701/120; 701/431; 701/16; 701/418; 701/454; 340/946; 340/951; 340/971; 340/972; 340/973; 244/75.1; 244/194; 244/177; 244/183; 244/184; 700/11; 700/84; 380/258

(58) Field of Classification Search ............. 701/9, 4, 701/8, 16, 213, 202, 120, 408, 431, 418, 701/454, 466; 340/951, 946, 980, 971, 972, 340/973, 975, 950; 244/75, 76, 177, 183, 244/184, 194, 195, 198, 118.5, 75.1; 342/476; 434/3, 20; 380/258; 700/11, 84
See application file for complete search history.

(56) References Cited

U.S. PATENT DOCUMENTS

| | | | | |
|---|---|---|---|---|
| 5,612,881 | A * | 3/1997 | Moroto et al. | 701/428 |
| 5,787,383 | A * | 7/1998 | Moroto et al. | 701/418 |
| 6,255,965 | B1 * | 7/2001 | D'Orso | 340/946 |
| 7,237,747 | B1 * | 7/2007 | Baudry | 244/76 R |
| 2004/0044446 | A1 * | 3/2004 | Staggs | 701/16 |
| 2004/0111192 | A1 * | 6/2004 | Naimer et al. | 701/9 |
| 2010/0023258 | A1 * | 1/2010 | Rouquette et al. | 701/202 |

FOREIGN PATENT DOCUMENTS

FR    2 847 553    5/2004

OTHER PUBLICATIONS

International Search Report dated Dec. 21, 2006.

* cited by examiner

*Primary Examiner* — Redhwan K Mawari
(74) *Attorney, Agent, or Firm* — Dickinson Wright PLLC (57) ABSTRACT

A device comprises means for computing the air-craft (A) current position, means for determining at least one maximum permitted deviation (E1) around a set position of the flight path of the flight plan according to accuracy and integrity performances of said current position computation and to the restriction of a flight range authorized in a flight corridor (6A, 6B), and a display system (7) for displaying at least one a distance scale (9) on a viewing screen (8), at least one a fixed symbol (10) displaying the current position and two movable pointers (13, 14) displaying the limits of said maximum permitted deviation (E1).

11 Claims, 8 Drawing Sheets

DISPLAYING METHOD AND DEVICE FOR AN AIRCRAFT FOLLOWING A FLIGHT PLAN

The present invention relates to a display method and device for an aircraft, in particular a transport airplane, which follows a flight plan.

It is known that, in an international context where air traffic is increasing ceaselessly, air corridors of ever smaller width are associated with the aircraft trajectories. To be able to reduce this air corridor width, certain performance features of said aircraft are in particular taken into account.

It Is known moreover that the performance features that an aircraft must sustain in order to remain in such an air corridor, are of two types, namely:
- guidance performance: the aim is to make the aircraft correctly follow a flight plan, that is to say to minimize a guidance error (dubbed the "Flight Technical Error" or FTE); and
- navigation performance: the aim is to have a good estimation of the actual position of the aircraft, that is to say to minimize a Position Estimation Error (PEE).

To sustain the previous performance features, it is therefore appropriate to minimize the sum of these two errors FTE and PEE, namely a total error which is dubbed the "Total System Error" or TSED The resilience of this parameter TSE is one of the conditions required in order to make it possible in particular:
- to make the aircraft fly according to novel types of approach, with respect to terrains containing obstacles or presenting landing restrictions;
- to make simultaneous approaches on landing runways that are closely spaced; and
- to permit lower minima of landing decision height.

Consequently, it is necessary for the pilot and the systems of the aircraft to monitor the performance in terms of guidance and navigation of said aircraft, with respect to the required performance. Specifically, such information makes it possible to advise the pilot and the systems on the margin remaining so as to keep the aircraft in the air corridor required.

The present invention relates to a display method for an aircraft which follows a flight plan, making it possible to provide a pilot of the aircraft with information allowing him to perform simple and accurate monitoring of the aircraft performance relating to the confinement of the aircraft in a flight corridor (or air corridor).

For this purpose, according to the invention, said display method is noteworthy in that the following series of successive steps is carried out in an automatic and repetitive manner:

a) the actual position of the aircraft is calculated;

b) at least one maximum permitted deviation about a setpoint position on a flight trajectory arising from said flight plan is determined as a function, on the one hand, of performance regarding accuracy and integrity of calculating said actual position of the aircraft and, on the other hand, of a constraint regarding flight zone permitted in a flight corridor associated with said flight plan; and c) at least one distance scale and, on this distance scale, at least the following are presented on at least one viewing screen:
- a first symbol which is fixed and which indicates said actual position which is taken as reference position; and
- two indicators which indicate the limits, generally on either side of the flight trajectory, of said maximum permitted deviation, said indicators being mobile and situated with respect to said first symbol each time in conformity with the results of the processings carried out in said steps a) and b).

Thus, by virtue of the elements (first symbol and indicators) displayed on the viewing screen, the pilot is able to evaluate in an accurate manner the position of the aircraft with respect to the maximum permitted deviation relating to this flight plan.

Moreover, by virtue of said distance scale, these elements give him an indication about the actual distance. Preferably, this distance scale is invariable, that is to say it always presents the same ratio between the depicted representation of a length and the corresponding real length, so that this information is always presented in a uniform manner.

In an advantageous manner, if said indicators move with respect to said first symbol so that said first symbol is no longer situated between these indicators, a first alert signal is emitted.

In a preferred embodiment:
- in step b), a setpoint position of the aircraft, corresponding to a position required by the flight plan is moreover determined; and
- in step c), a second symbol which indicates said setpoint position on the distance scale is presented, moreover, on said viewing screen, said second symbol being mobile and situated with respect to said first symbol each time in conformity with the results of the processings carried out in said steps a) and b).

Thus, by virtue of these elements (first and second symbols) displayed on the viewing screen, the pilot is able to evaluate in an accurate manner the position of the aircraft with respect to the position required by the flight plan.

Furthermore, advantageously:
- in step c), an auxiliary deviation is moreover determined which illustrates a guidance performance of the aircraft, as a function of a piloting mode activated to pilot the aircraft; and
- in step d), two markers which indicate on the distance scale the limits, generally on either side of the flight trajectory, of said auxiliary deviation are presented, moreover, on said viewing screen, said markers being mobile and situated with respect to said first symbol each time in conformity with the results of the previous processing.

Additionally, in an advantageous manner:
- said maximum permitted deviation is compared with said auxiliary deviation; and
- if said maximum permitted deviation becomes less than said auxiliary deviation, a second alert signal is emitted.

In a first variant, said maximum Permitted deviation is a maximum permitted lateral deviation and said flight trajectory is a lateral flight trajectory.

In a particular embodiment, in step b), the smallest of the following three differences is determined as maximum permitted lateral deviation:
- a difference between a corridor constraint relating to the flight corridor and an uncertainty in the calculated actual position;
- a difference between twice said corridor constraint and a horizontal integrity limit; and
- a difference between twice said corridor constraint and a probability relating to a transverse navigation error.

In a second variant or as a supplement to the aforesaid first variant, said maximum permitted deviation is a maximum permitted vertical deviation and said flight trajectory is a vertical flight trajectory.

In a third variant or as a supplement to one or both aforesaid variants, said maximum permitted deviation is a longitudinal deviation according to the flight trajectory.

Additionally, in a particular embodiment, in step c), one or more of the following distance scales is or are presented:
- a lateral scale;
- a longitudinal scale; and
- a vertical scale.

Furthermore, advantageously, in step c), a combined display of lateral and longitudinal deviations is carried out on one and the same distance scale, corresponding to a horizontal deviation.

The present invention also relates to a display device for an aircraft which follows a flight plan.

According to the invention, said device is noteworthy in that it comprises:
- a first means for calculating the actual position of the aircraft;
- possibly a second means for determining a setpoint position of the aircraft, corresponding to a position required by the flight plan;
- a third means for determining at least one maximum permitted deviation (lateral, vertical or longitudinal) about a setpoint position on a flight trajectory (lateral or vertical or according to the latter), arising from said flight plan, as a function, on the one hand, of performance regarding accuracy and integrity of calculating said actual position of the aircraft and, on the other hand, of a constraint regarding flight zone permitted in a flight corridor associated with said flight plan; and
- a display system for presenting, on at least one viewing screen, at least one distance scale (preferably invariable) and, on this distance scale:
- a first symbol which is fixed and which indicates said actual position which is taken as reference position;
- possibly a second symbol which indicates said setpoint position; and
- two indicators which indicate the limits (on either side of the flight trajectory in the event of lateral or vertical deviation) of said maximum permitted deviation, said display system being formed so as to move said second symbol and said indicators which are mobile so that they are situated with respect to said first symbol each time in conformity with the results of the processings carried out by said first, second and third means.

Preferably, said device in accordance with the invention comprises, moreover, a fourth means for determining an auxiliary deviation which illustrates a guidance performance of the aircraft as a function of an activated piloting mode, and said display system presents moreover on said viewing screen, two markers which indicate on the distance scale the limits (on either side of the flight trajectory in the event of lateral or vertical deviation) of said auxiliary deviation, said display system being formed so as to move said markers which are mobile so that they are situated with respect to said first symbol each time in conformity with the results of the processings carried out by said fourth means.

Furthermore, in a particular embodiment, said device comprises, moreover:
- means capable of emitting at least one alert signal; and/or
- a database comprising constraint values, in particular corridor constraint values, relating to a flight corridor associated with a flight plan.

Additionally, advantageously:
- at least said third means forms part of a flight management system of the aircraft; and/or
- said viewing screen is a primary piloting screen.

The figures of the appended drawing will clearly elucidate the manner in which the invention can be embodied. In these figures, identical references designate similar elements.

FIGS. 6 to 8 schematically show variant embodiments of indications presented in accordance with the invention on a viewing screen The device 1 in accordance with the invention and represented schematically in FIG. 1 is intended to display information specified hereinafter on an aircraft A, in particular a transport airplane, which Follows a flight plan. This flight plan is determined in a customary manner either before the flight, or in the course of the flight, for example by way of a flight management system of FMS type.

According to the invention, said device 1 comprises:
- a set 2 of information sources comprising in particular a customary means, furnished for example with a sensor of C-PS type ("Global Positioning System"), for calculating the actual position of the aircraft A;
- a means 3 for determining a setpoint position of the aircraft A, corresponding to a position required by said flight plan that the aircraft A must follow;
- a means 4 for determining in real time at least one maximum permitted deviation on either side of a flight trajectory which arises in a customary manner from said flight plan. Within the framework of the present invention, this may involve a maximum permitted lateral deviation relating to a lateral flight trajectory and/or a maximum permitted vertical deviation relating to a vertical flight trajectory and/or a maximum permitted longitudinal deviation according to a flight trajectory. By way of nonlimiting illustration, the following description applies to a maximum permitted lateral deviation E1 on either side of a lateral flight trajectory 5 which is represented schematically on the upper part of FIGS. 2 to 5. According to the invention, said means 4 determines said maximum permitted lateral deviation E1, as a function:
- on the one hand, of performance regarding accuracy and integrity of calculating said actual position of the aircraft A, that is to say of the confidence placed in the measurements and the calculations carried out to determine this actual position; and
- on the other hand, of a constraint regarding permitted flight zone, and more precisely of a corridor constraint CV, relating to a flight corridor defined by limits 6A and 6B also represented on the upper part of FIGS. 2 to 5. Said flight corridor (or air corridor) is associated with said flight plan and is such that the aircraft A must remain inside this flight corridor when it follows said flight plan; and
- a display system 7 which comprises at least one viewing screen 8 and which presents, on this viewing screen 8, at least one distance scale 9 and, on this distance scale 9 graduated For example in nautical miles:
- a symbol 10, for example a dash disposed vertically, which is fixed and which indicates said actual position of the aircraft A, this actual position being taken as reference position; and
- a set of indications 11 which is mobile with respect to said fixed symbol 10.

Figure 2:
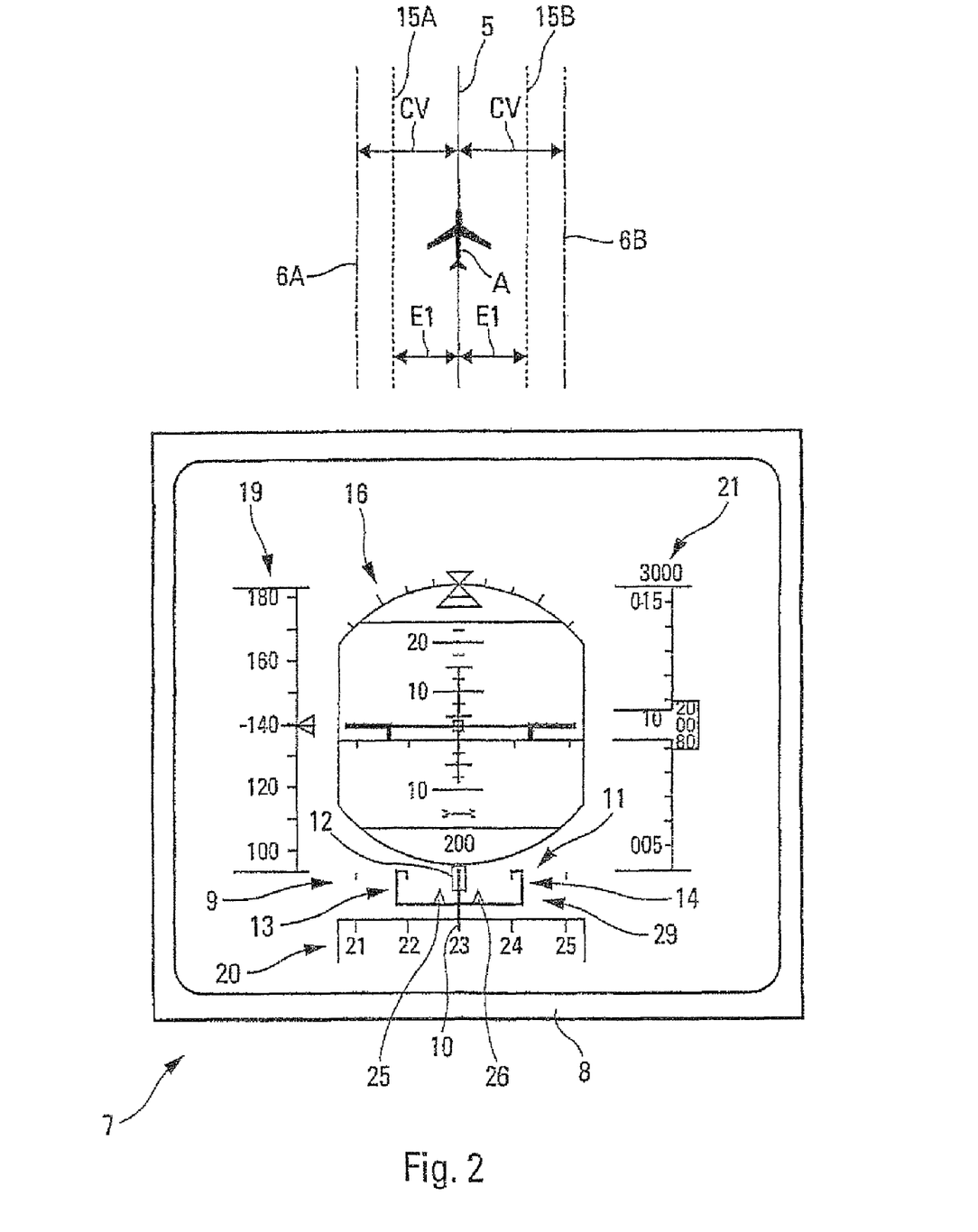
FIGS. 2 to 5 schematically show a display carried out in accordance with the invention, by way of example on a primary piloting screen, respectively in different flight situations.

Said set of indications 11 comprises at least:
- a symbol 12, for example a rectangle or a dash disposed vertically, which indicates said setpoint position, that is to say the position required on the lateral flight trajectory 5 by the flight plan; and
- two indicators 13 and 14 which indicate the limits 15A and 15B (on either side of the lateral flight trajectory 5) of said maximum permitted lateral deviation E1, as represented in FIG. 2.

According to the invention, said display system 7 is formed so as to move said set of indications 11 which is mobile so that it is always situated with respect to said symbol 10 in conformity with the results of the aforesaid processings (carried out in real time).

Thus, by virtue of the elements (symbols 10 and 12, and indicators 13 and 14) displayed on the viewing screen 8, the pilot is able to evaluate in an accurate manner the position of the aircraft A, on the one hand, with respect to the position required by the flight plan and, on the other hand, with respect to the maximum permitted lateral deviation E1 relating to this flight plan.

Moreover, by virtue of said distance scale 9, these elements 10, 12, 13, 14 give him an indication about the corresponding actual distances. Preferably, this distance scale 9 is invariable, that is to say it always presents the same ratio between the depicted representation of a length and the corresponding real length, so that this information is always presented in a uniform manner as regards the length.

As regards display (in particular for a longitudinal deviation), several possibilities are envisageable within the framework of the present invention, in particular: longitudinal deviation on a specific distance scale (in addition to two distance scales, lateral and vertical, it being possible to envisage all combinations: display of just one, of two or of the three distance scales); combined display of the lateral and longitudinal deviations on one and the same distance scale, corresponding to a horizontal deviation.

In FIGS. 2 to 5 are represented on the upper part a flight situation and on the Lower part the display carried out in accordance with the invention for the corresponding situation.

FIG. 2 illustrates an example where the aircraft A is situated on the lateral flight trajectory 5. In this case, the symbol 10 indicating the actual position of the aircraft A and the symbol 12 indicating the prescribed position or setpoint position on said lateral flight trajectory 5 are superimposed.

Figure 3:
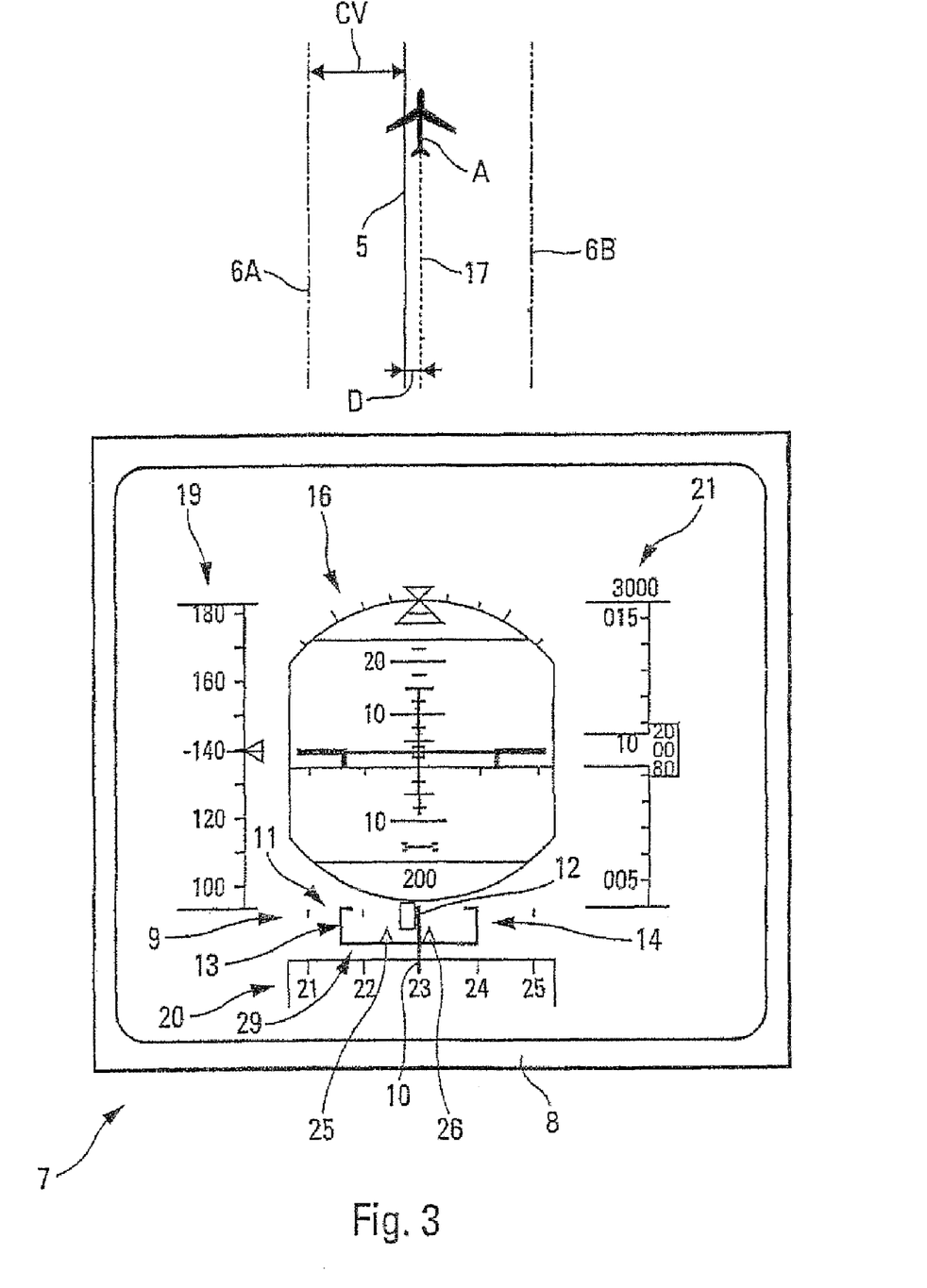

In the example of FIG. 3, the actual position of the aircraft A (which is situated on an actual lateral trajectory 17) is shifted laterally by a distance D with respect to the prescribed lateral trajectory 5. Also, the symbol 12 is shifted with respect to said fixed symbol 10. However, as this lateral distance or deviation D is less than the maximum permitted lateral deviation E1 (not represented), said symbol 10 is always situated between the indicators 13 and 14 which indicate the limits, on either side of the lateral flight trajectory 5, of said maximum permitted lateral deviation E1. The flight of the aircraft A remains in this case in accordance with the directives, the aircraft A being situated at a sufficient distance from the limits 6A and 6B of the flight corridor, thereby safeguarding it from any risk of exiting said flight corridor.

Figure 4:
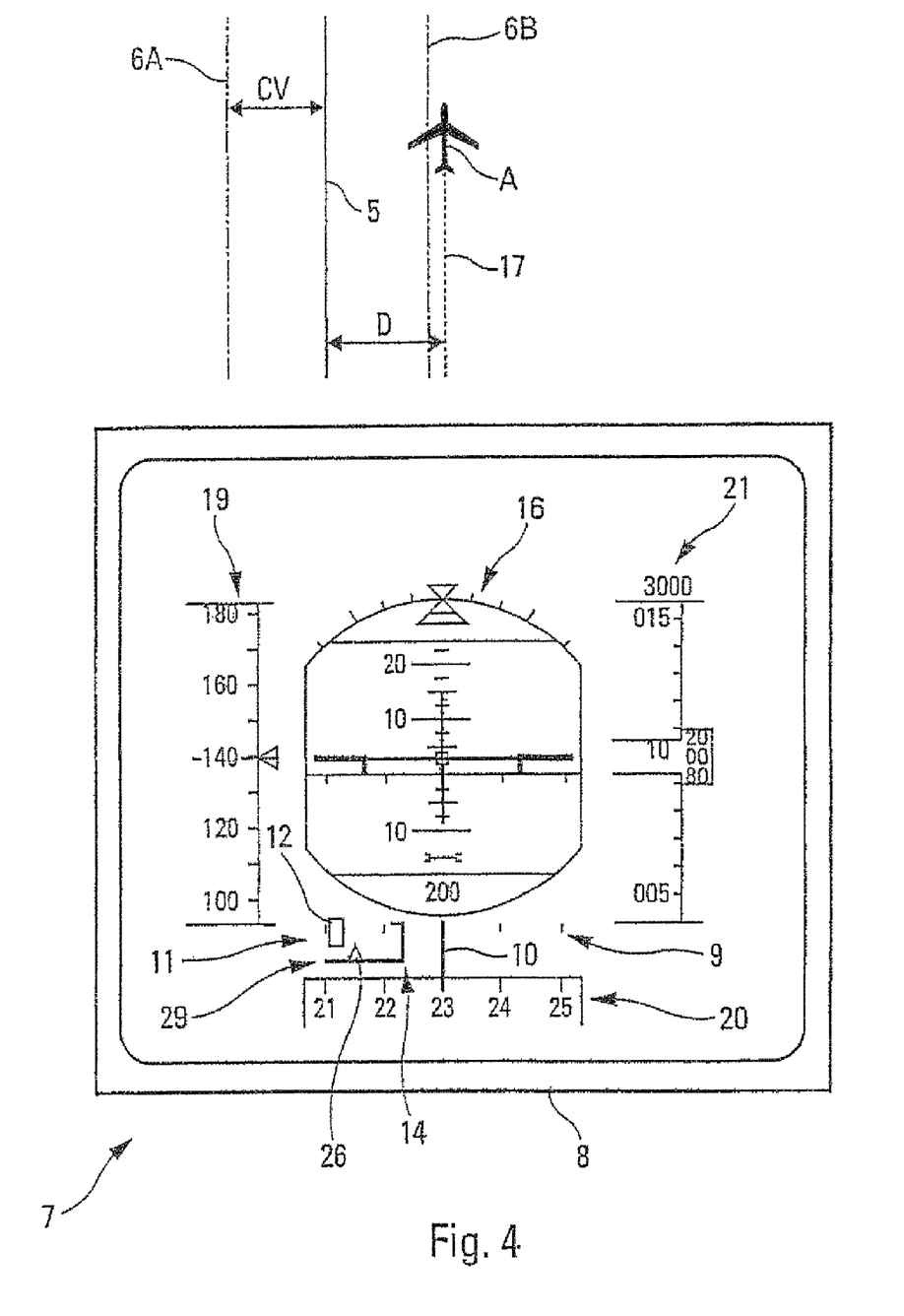

On the other hand, in the example of FIG. 4, the lateral deviation D is greater than the maximum permitted lateral deviation E1, and the aircraft A is at risk of being outside said flight corridor. The set of indications 11 is therefore shifted laterally with respect to said symbol 10. In this case, the aircraft A no longer complies with the constraint of confinement in the flight corridor.

The device 1 in accordance with the invention comprises alert means 10 for emitting an alert signal in such a situation. The alert signal can correspond to a message which is displayed on a screen, for example on the viewing screen 8 or on any other screen of the aircraft A, such as a multifunction control screen of MCDU ("Multipurpose Control Display Unit") type or a navigation screen of ND ("Navigation Display") type for example. The alert signal can also correspond to information which is dispatched to an alert system of FWS ("Flight Warning System") type.

In a preferred embodiment, an alert is highlighted on the viewing screen 8 (represented in FIGS. 2 to 5) by a blinking of the set of indications 11 and possibly of the symbol 10.

In the embodiment of FIGS. 2 to 5, said viewing screen 8 is a primary piloting screen of PFD ("Primary Flight Display") type which displays in a customary manner a central zone 16 comprising an artificial horizon which tilts when the aircraft A tilts. In a customary manner, such a primary piloting screen S also comprises a speed scale 19, a heading scale 20 and an altitude scale 21.

Additionally, in a particular embodiment, said corridor constraint CV which depends on the current flight plan, is recorded in a database 22 of the device 1.

Furthermore, in a preferred embodiment, said means 4 determines said maximum permitted lateral deviation E1, as the smallest of the following three differences that it calculates in real time:
- a difference between said corridor constraint CV arising from said database 22 and a predetermined uncertainty in said calculated actual position;
- a difference between twice said corridor constraint CV and a predetermined horizontal integrity limit; and
- a difference between twice said corridor constraint CV and a predetermined probability relating to a transverse navigation error.

Additionally, in a particular embodiment, said device 1 moreover comprises:
- a customary means 23, for indicating the piloting mode (automatic pilot, flight director) used at the current instant by the aircraft A, to follow said flight plan; and
- a means 24 for determining an auxiliary deviation E2 which illustrates a guidance performance of the aircraft A, as a function of said piloting mode activated at the current instant to pilot the aircraft A, information which is received from said means 23.

This auxiliary deviation E2 can also depend on the geometry of the flight trajectory or conditions outside the aircraft A, such as the wind predicted on the flight trajectory.

In this case, the display system 7 presents, moreover, on said viewing screen 8, two markers 25 and 26 which indicate on the distance scale 9 the limits 39A and 39B (FIG. 5), on either side of the lateral flight trajectory 5, of said auxiliary deviation E1. Said markers 25 and 26 form part of said set of indications 11 and move with respect to said symbol 10 in conformity with the results of the previous processing. The markers 25 and 26 therefore indicate the intrinsic performance of the aircraft A, related to the piloting mode activated.

Figure 5:
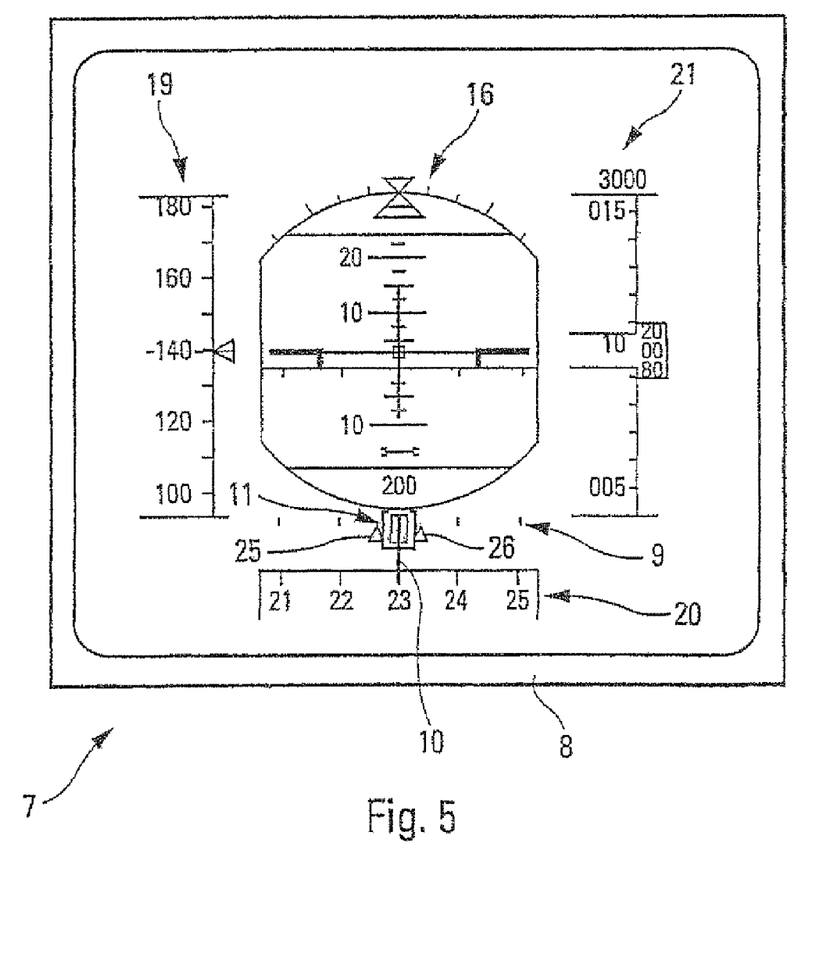

The device 1 in accordance with the invention comprises, moreover, a means 27 for comparing the maximum permitted lateral deviation E1 received from said means 4 with the auxiliary deviation E2 received from said means 24 Represented in FIG. 5 is a deviation E3 which corresponds to twice the auxiliary deviation E2. When the maximum permitted lateral deviation E1 becomes less than the auxiliary deviation E2, said device 1 emits a corresponding alert signal. In this case, the enabled piloting mode does not allow the aircraft A to remain in the flight corridor. This is due either to a degradation in guidance performance (the deviation between the markers 25 and 26 increasing), or to a degradation in navigation performance (the deviation between the indicators 13 and 14 decreasing, as in the example of FIG. 5). In this case, the alert signal emitted can be of the same type as indicated previously.

Figure 6:
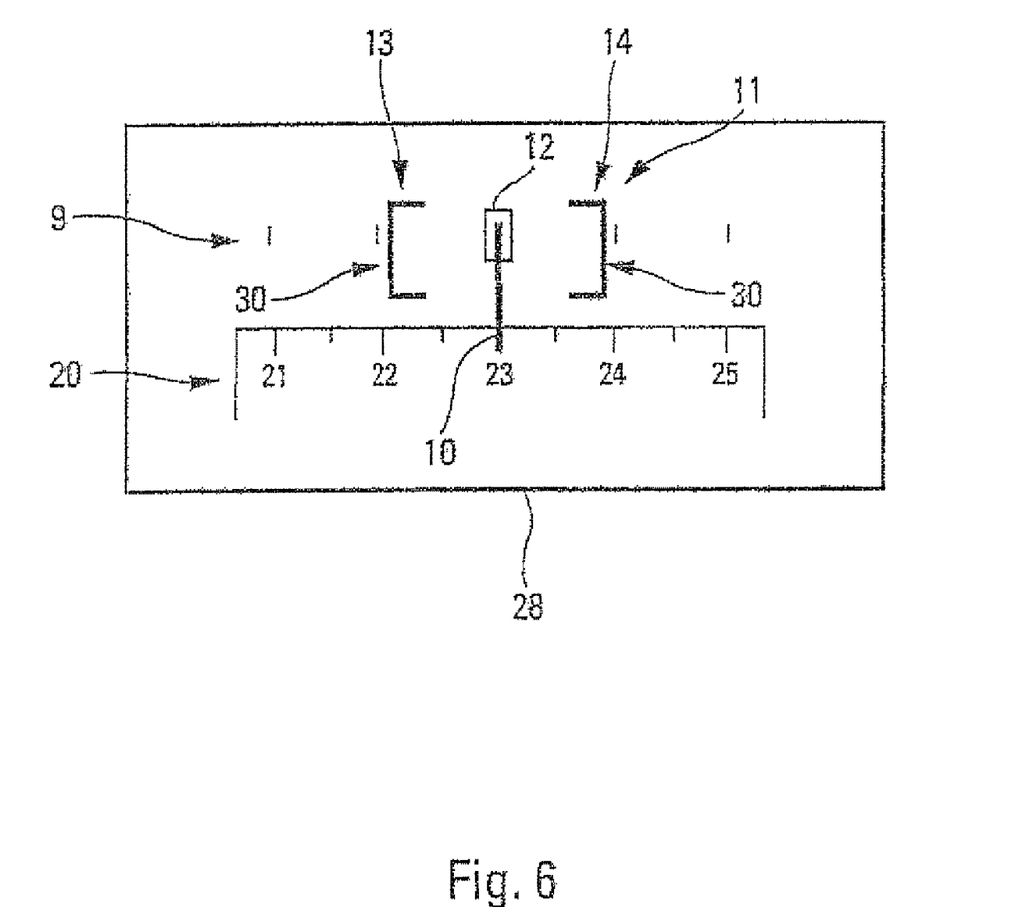
Figure 7:
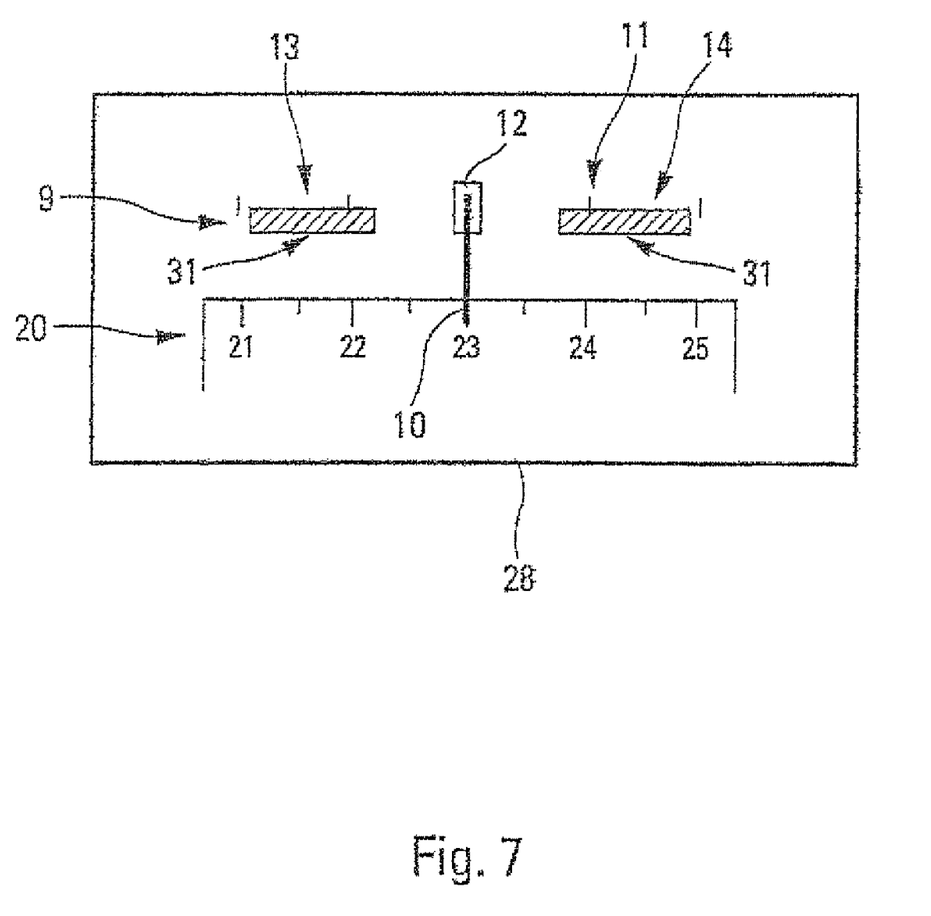
Figure 8:
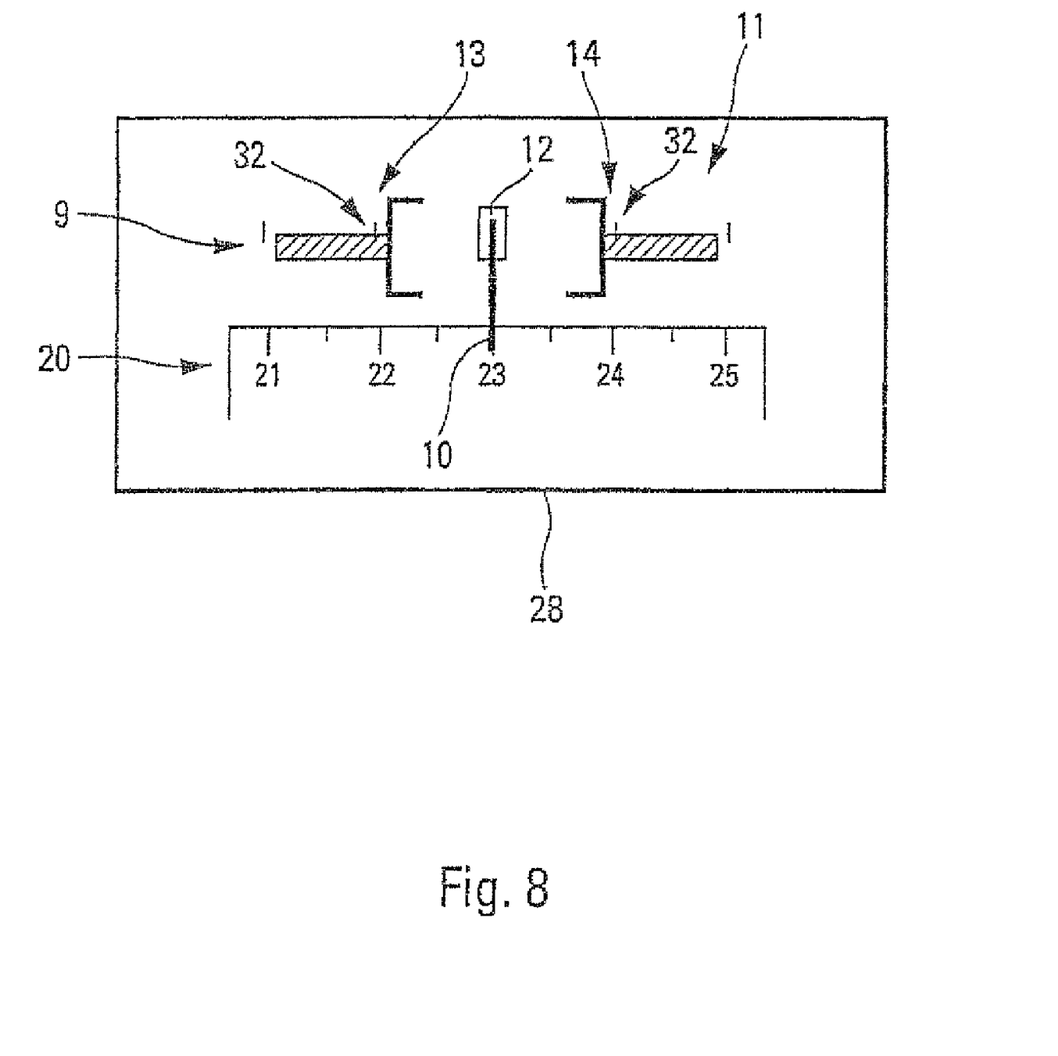

The set of indications 11 and the symbol 10 are displayed on a display zone 28 of the viewing screen 8. This display zone 28 is represented in FIGS. 6 to 8. According to the invention, said markers 13 and 14 can be represented graphically in various ways. By way of example, said markers 13 and 14 can be represented:

in the form of two brackets linked together and forming a set 29, as illustrated in FIGS. 2 to 5;
in the form of brackets 30, as illustrated in FIG. 6;
in the form of surfaces 31, as illustrated in FIG. 7; or
in the form of sets 32 comprising a bracket and a surface connected together, as illustrated in FIG. 8.

Figure 1:
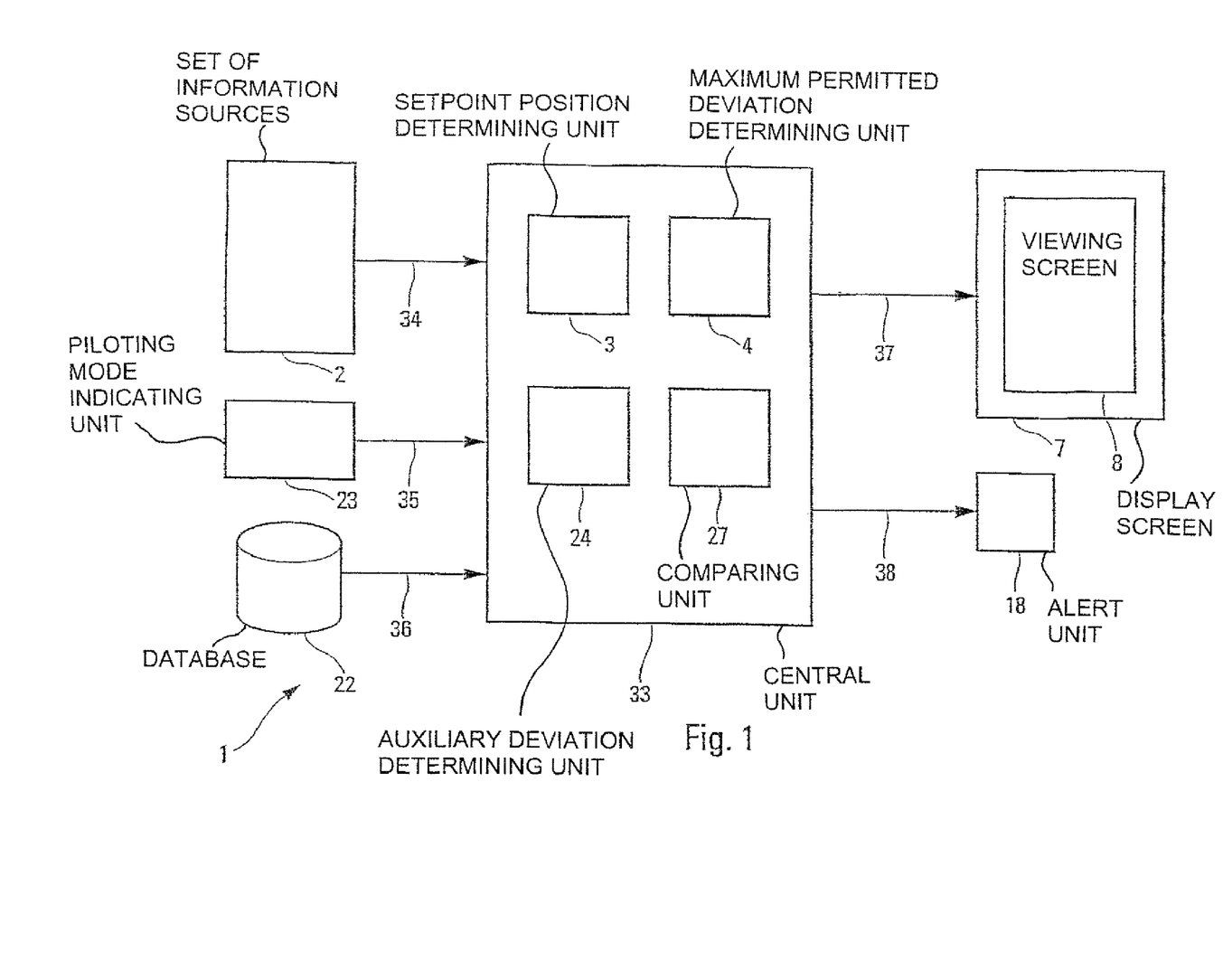
FIG. 1 is the schematic diagram of a display device in accordance with the invention.

Additionally, in a particular embodiment, said means 3, 4, 24 and 27 form part of a central unit 33 which is connected by way of links 34 to 38 respectively to the set 2, by means 23, to the database 22, to the display system 7 and to the alert means 18, as represented in FIG. 1. Said central unit 33 corresponds, for example, to a flight management system of FMS type ("Flight Management System").

The invention claimed is:

1. A display method for an aircraft which follows a flight plan, wherein the display method comprises carrying out the following series of successive steps in an automatic and repetitive manner:
  a) calculating an actual position of the aircraft;
  b) determining, by a processor, at least one maximum permitted deviation about a setpoint position on a flight trajectory arising from said flight plan as a function of performance regarding accuracy and integrity of the calculating of said actual position of the aircraft and of a constraint regarding a flight zone permitted in a flight corridor associated with said flight plan; and
  c) presenting, on at least one viewing screen, at least one distance scale and, on the at least one distance scale, presenting at least the following:
  a first symbol which is fixed and which indicates said actual position which is taken as a reference position; and
  two indicators which respectively indicate limits of said at least one determined maximum permitted deviation, said indicators being mobile and situated with respect to said first symbol each time in conformity with the results of the calculating of the actual position of the aircraft and the determining of the at least one maximum permitted deviation carried out in said steps a) and b), respectively,
  wherein the display method further comprises:
  determining, in step b), an auxiliary deviation which illustrates a guidance performance of the aircraft, as a function of a piloting mode activated to pilot the aircraft; and
  presenting, in step c), two markers which indicate on the at least one distance scale limits of said auxiliary deviation on said viewing screen, said markers being mobile and situated with respect to said first symbol each time in conformity with the results of the determining of the auxiliary deviation in step b).

2. The method as claimed in claim 1, further comprising, if said indicators move with respect to said first symbol so that said first symbol is no longer situated between the indicators, emitting a first alert signal.

3. The method as claimed in claim 1, further comprising:
determining, in step b), a setpoint position of the aircraft corresponding to a position required by the flight plan; and
presenting, in step c), a second symbol which indicates said setpoint position on the at least one distance scale on said at least one viewing screen, said second symbol being mobile and situated with respect to said first symbol each time in conformity with the results of the calculating of the actual position of the aircraft and the determining of the at least one maximum permitted deviation carried out in said steps a) and b), respectively.

4. The method as claimed in claim 2, further comprising:
comparing said at least one maximum permitted deviation with said auxiliary deviation; and
if said at least one maximum permitted deviation becomes less than said auxiliary deviation, emitting a second alert signal.

5. The method as claimed in claim 1, wherein said at least one maximum permitted deviation is a maximum permitted lateral deviation and said flight trajectory is a lateral flight trajectory.

6. The method as claimed in claim 5, wherein step b) further comprises determining the smallest of the following three differences as said at least one maximum permitted lateral deviation:
a difference between a corridor constraint relating to the flight corridor and an uncertainty in the calculated actual position;
a difference between twice said corridor constraint and a horizontal integrity limit; and
a difference between twice said corridor constraint and a probability relating to a transverse navigation error.

7. The method as claimed in claim 1, wherein said at least one maximum permitted deviation is a maximum permitted vertical deviation and said flight trajectory is a vertical flight trajectory.

8. The method as claimed in claim 1, wherein said at least one maximum permitted deviation is a longitudinal deviation according to the flight trajectory.

9. The method as claimed in claim 1, wherein said at least one distance scale is invariable.

10. The method as claimed in claim 1, wherein step c) further comprises presenting one or more of the following distance scales:
a lateral scale;
a longitudinal scale; and
a vertical scale.

11. The method as claimed in claim 1, wherein step c) further comprises presenting a combined display of lateral and longitudinal deviations on the at least one distance scale, corresponding to a horizontal deviation.

* * * * *